US011269335B2

(12) United States Patent
Murai

(10) Patent No.: US 11,269,335 B2
(45) Date of Patent: Mar. 8, 2022

(54) AUTONOMOUS CART

(71) Applicant: KABUSHIKI KAISHA TOYOTA JIDOSHOKKI, Kariya (JP)

(72) Inventor: Makoto Murai, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 301 days.

(21) Appl. No.: 16/436,076

(22) Filed: Jun. 10, 2019

(65) Prior Publication Data

US 2019/0377353 A1    Dec. 12, 2019

(30) Foreign Application Priority Data

Jun. 11, 2018  (JP) .............................. JP2018-110859

(51) Int. Cl.
  *G05D 1/02*   (2020.01)
  *G01S 17/04*  (2020.01)
  *G01S 17/931* (2020.01)

(52) U.S. Cl.
  CPC ............ *G05D 1/0214* (2013.01); *G01S 17/04* (2020.01); *G01S 17/931* (2020.01); *G05D 1/0248* (2013.01); *G05D 2201/0216* (2013.01)

(58) Field of Classification Search
  CPC .............. G05D 1/0214; G05D 1/0248; G05D 2201/0216; G05D 1/0274; G05D 1/024; G05D 1/0234; G01S 17/04; G01S 17/931; G01S 17/42
  See application file for complete search history.

(56) References Cited

U.S. PATENT DOCUMENTS

| 9,471,894 B2 | 10/2016 | Palamarchuk et al. |
| 2009/0228166 A1* | 9/2009 | Durkos ................ G05D 1/0219 701/26 |
| 2017/0072558 A1* | 3/2017 | Reynolds ............. G05D 1/0246 |
| 2018/0059682 A1* | 3/2018 | Thode .................. B60W 40/105 |
| 2019/0161274 A1* | 5/2019 | Paschall, II .......... B65G 1/0492 |

FOREIGN PATENT DOCUMENTS

| JP | 2008-186097 A | 8/2008 |
| JP | 2017-083223 A | 5/2017 |

OTHER PUBLICATIONS

Office Action dated Aug. 27, 2020 in European Application No. 19177572.5.

* cited by examiner

*Primary Examiner* — Kelly D Williams
(74) *Attorney, Agent, or Firm* — Sughrue Mion, PLLC

(57) ABSTRACT

An autonomous cart includes an obstacle detecting member, a driving member, a storing section, and a control section. The obstacle detecting member outputs detection information including an obstacle position and obstacle luminance within a planar obstacle-detection region. The storing section stores designated area map information indicating a position of an obstacle within a designated area. At least one command member to which a command for the control section is assigned is included in the obstacle and is disposed within the designated area at a position where execution of the command is desired. The control section controls the driving member based on the designated area map information and a current position of the autonomous cart to cause the autonomous cart to autonomously travel while avoiding the obstacle within the designated area. The control section follows the command detected by the control section based on the obstacle luminance in the detection information.

5 Claims, 9 Drawing Sheets

FIG. 7
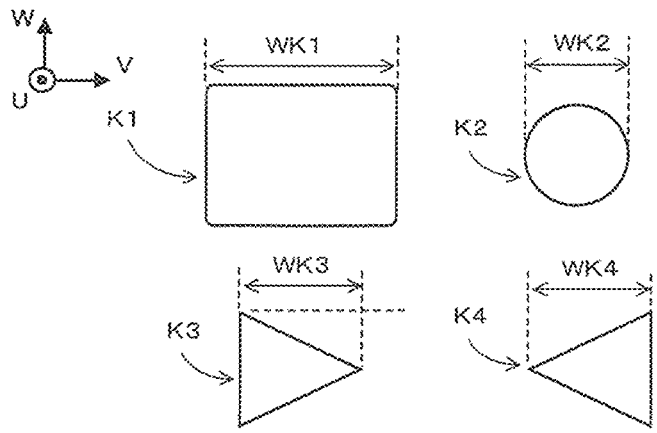
FIG. 8
| COMMAND | SCAN DIRECTION LENGTH |
|---|---|
| NO-ENTRY | $A1 \pm \Delta A2$ |
| ENTRY-ALLOWED | $Bw \pm \Delta Bu$ |
| STOP | $C1 \pm \Delta C2$ |
| : | : |
FIG. 9
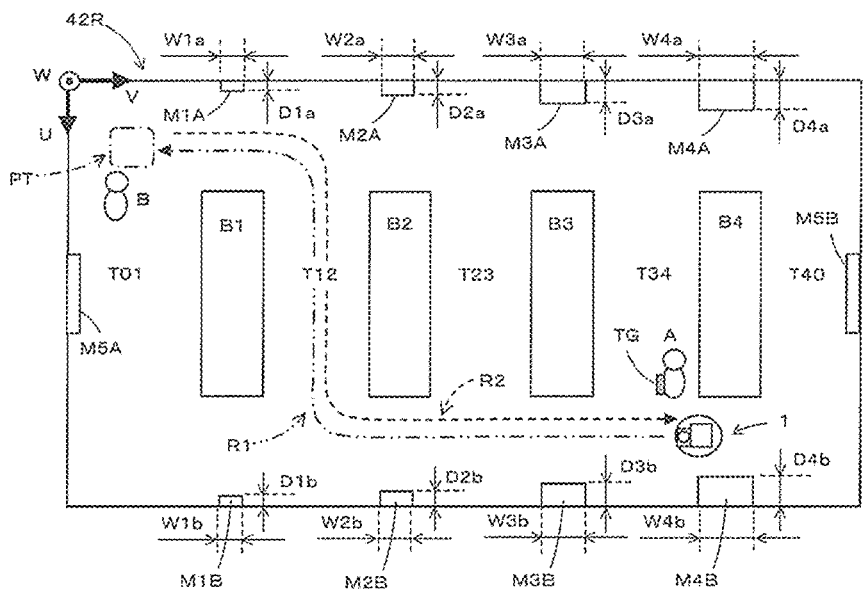

FIG. 17
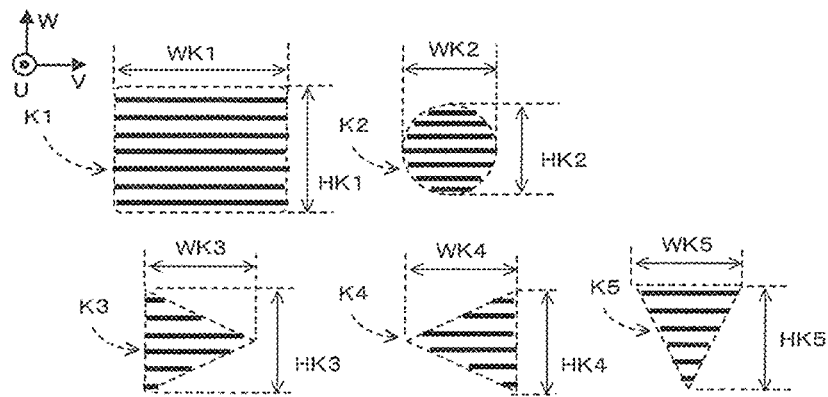
FIG. 18
| COMMAND | SHAPE |
|---|---|
| NO-ENTRY | RECTANGULAR |
| ENTRY-ALLOWED | CIRCULAR |
| ENTRY-ALLOWED-ON RIGHT-SIDE | RIGHTWARD-TRIANGULAR |
| ENTRY-ALLOWED-ON LEFT-SIDE | LEFTWARD-TRIANGULAR |
| STOP | DOWNWARD-TRIANGULAR |
| : | : |
FIG. 19
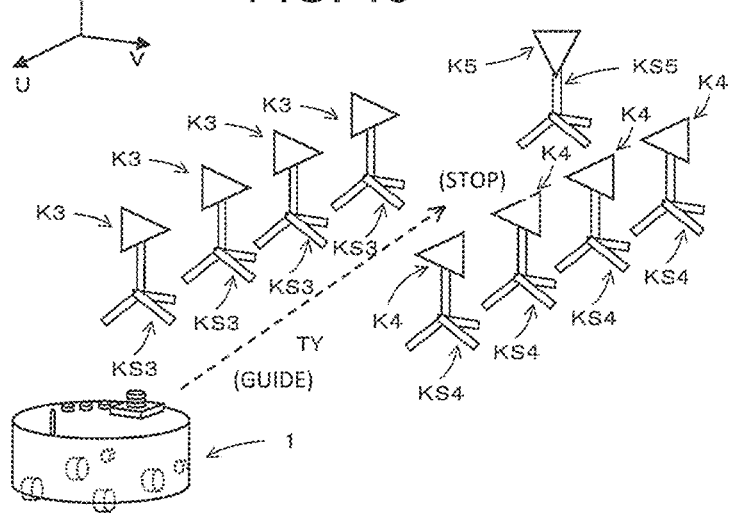

AUTONOMOUS CART

CROSS-REFERENCE TO RELATED APPLICATION

This application claims priority to Japanese Patent Application No. 2018-110859 filed on Jun. 11, 2018, the entire disclosure of which is incorporated herein by reference.

BACKGROUND ART

The present disclosure relates to an autonomous cart.

In recent years, autonomous carts have been occasionally used in facilities such as distribution centers, parts distribution centers, and airports for pickup operation to pick up desired items from storage such as shelves and to collect them to one place (consolidating point). For example, in a distribution center, an operator A picks up target items from shelves and places them on an autonomous cart. The operator A operates the autonomous cart to deliver the items to "a consolidating point". Then, the autonomous cart autonomously travels to the consolidating point while avoiding obstacles, and stops at the consolidating point. For example, an operator B waits at the consolidating point to collect the items from the autonomous cart. The operator B operates the autonomous cart to "return" the autonomous cart. Then, the autonomous cart autonomously returns to a vicinity of the operator A while avoiding obstacles.

For example, Japanese Patent Application Publication No. 2017-83223 mentions a travelling apparatus (i.e., an autonomous cart) that includes a distance measuring device and an obstacle determining section. The distance measuring device is configured to measure a distance from the travelling apparatus to an object by emitting measurement light (e.g. laser beam) in a lateral direction or in a lateral direction and a vertical direction, and receiving reflected measurement light. The obstacle determining section is configured to determine according to information provided from the distance measuring device whether obstacles exist. A scanned detection area is divided into a plurality of subareas. A threshold for recognizing obstacles is set for each subarea. Consequently, the obstacle determining section determines obstacles by simple calculations.

Japanese Patent Application Publication No. 2008-186097 mentions an autonomous travelling apparatus (i.e., an autonomous cart) that includes an electronic-tag reader and an operation control section. The electronic-tag reader is configured to wirelessly read information of electronic tags, and the operation controlling section is configured to control operation of the autonomous travelling apparatus by using the information read from the electronic tags. In an area where the autonomous travelling apparatus is used, a plurality of electronic tags for detection of a dangerous region (no-entry region) is embedded into a floor in a dangerous region (no-entry region). According to Japanese Patent Application Publication No. 2008-186097, the electronic tags for detection of a dangerous region embedded into a floor prevent the autonomous travelling apparatus from entering a dangerous region.

A designated area where an autonomous cart is used may include a passage where the autonomous cart ought not to enter (e.g., a relatively rough passage or a passage where an unscheduled maintenance is performed). It is not desired that an autonomous cart enters such a passage (no-entry passage). Especially, even if an unexpected limitation (e.g., no entry) on an autonomous cart is found in a particular place in a designated area, the unexpected limitation is desired to be easily dealt with.

The travelling apparatus mentioned in Japanese Patent Application Publication No. 2017-83223 accurately measures a distance from the travelling apparatus to obstacles with laser beam, but does not mention a no-entry region. Therefore, it cannot be easy to make the passage no-entry for the travelling apparatus if it is required unexpectedly.

In the autonomous travelling apparatus mentioned in Japanese Patent Application Publication No. 2008-186097, electronic tags are embedded into a floor in a dangerous region (no-entry region). This needs a work to embed electronic tags into a floor, so that it cannot be easy to make the passage no-entry if it is required unexpectedly. Since operators step on the electronic tags embedded into a floor and carts travel on the electronic tags embedded into a floor, the electronic tags may deteriorate and need to be replaced. Work for embedding electronic tags and work for replacing embedded electronic tags are both troublesome work. Therefore, it cannot be easy to make the passage no-entry if it is required unexpectedly.

The present disclosure, which has been made in light of the above-described problem, is directed to providing an autonomous cart that allows an operator to easily and quickly deal with an unexpected limitation on the autonomous cart, which may be found in a particular place in a designated area where the autonomous cart is used, without performing troublesome work.

SUMMARY

In accordance with an aspect of the present disclosure, there is provided an autonomous cart that autonomously travels within a designated area. The autonomous cart includes an obstacle detecting member, a plurality of wheels, a driving member, a storing section, a control section. The obstacle detecting member has a planar obstacle-detection region that has a two-dimensional planar shape and is scanned with laser beam to detect an obstacle. The obstacle detecting member is configured to output detection information that includes an obstacle position and obstacle luminance. The obstacle position is a position of the obstacle within the planar obstacle-detection region, and the obstacle luminance is luminance of the obstacle. The driving member is configured to drive at least one of the wheels. The control section is configured to control the driving member. The storing section is configured to store designated area map information that indicates a position of a preliminarily known obstacle within the designated area. At least one command member to which a command for the control section is assigned is included in the obstacle and is disposed within the designated area at a position where execution of the command is desired. The control section is configured to receive the detection information from the obstacle detecting member. The control section is configured to determine a current position of the autonomous cart within the designated area, based on the detected obstacle position and the designated area map information stored in the storing section. The control section is configured to control the driving member based on the designated area map information and the current position of the autonomous cart to cause the autonomous cart to autonomously travel while avoiding the obstacle within the designated area. The control section is configured to follow the command assigned to the command member that is detected by the control section based on the obstacle luminance in the detection information provided from the obstacle detecting member.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure together with objects and advantages thereof, may best be understood by reference to the following description of the embodiment together with the accompanying drawings in which:

FIG. 7 is a view illustrates appearance examples of command members;

FIG. 8 is a diagram that depicts an example of command information in which commands are assigned according to lengths of command members in a scan direction;

FIG. 9 is a diagram that illustrates an example a designated area where the autonomous cart is used;

FIG. 17 is a diagram of example of shapes of command members determined with the cubical obstacle detecting member, FIG. 18 is a diagram that depicts an example of command information in which commands are assigned according to shapes of the command members; and FIG. 19 is a perspective view of the autonomous cart and command members, illustrating a guide path for guiding the autonomous cart is formed between command members for entry-allowed region.

DETAILED DESCRIPTION OF THE EMBODIMENTS

Figure 13:
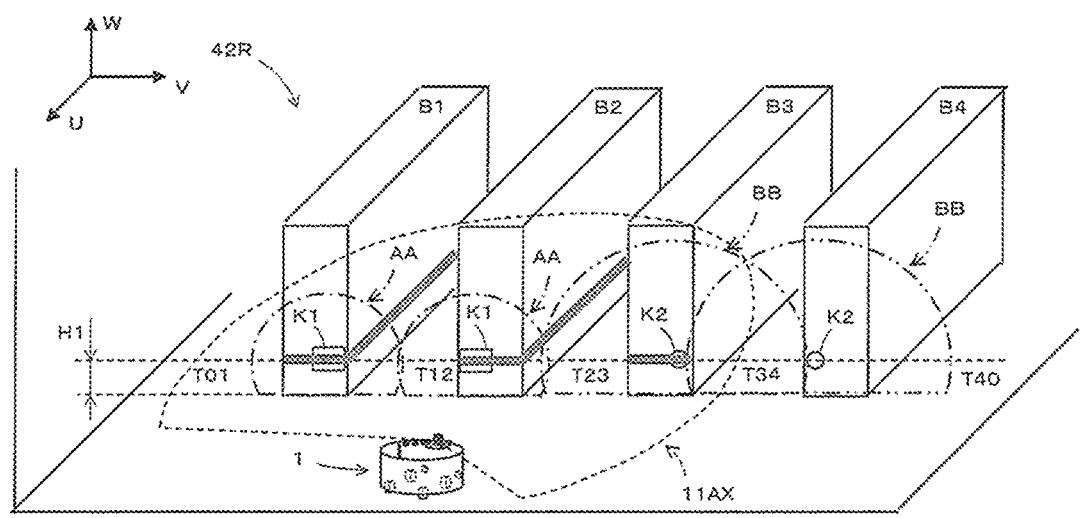
FIG. 13 is a diagram that illustrates an example of arrangement where a no-entry region and an entry-allowed region are formed with command members.

Hereinafter, embodiments of the present disclosure will be described with reference to the drawings. In the drawings where an X-axis, a Y-axis, and a Z-axis are illustrated, the X-axis, the Y-axis, and the Z-axis are perpendicular to each other. The Z-axis represents a vertically upward direction, the X-axis represents a forward direction from an autonomous cart, and the Y-axis represents a leftward direction from the autonomous cart. In the drawings where a U-axis, a V-axis, and a W-axis are illustrated, the U-axis, the V-axis, and the W-axis are perpendicular to each other. The W-axis represents a vertically upward direction. The U-axis in FIG. 13 represents a depth direction from a far side toward a front side with respect to a viewer of the FIG. 13, and the U-axis direction indicated in each of the figures corresponds to the U-axis direction of FIG. 13. The V-axis represents a rightward direction in a width direction of the designated area.

[Appearance (FIG. 1) and Whole Configuration (FIG. 2) of Autonomous Cart]

Figure 1:
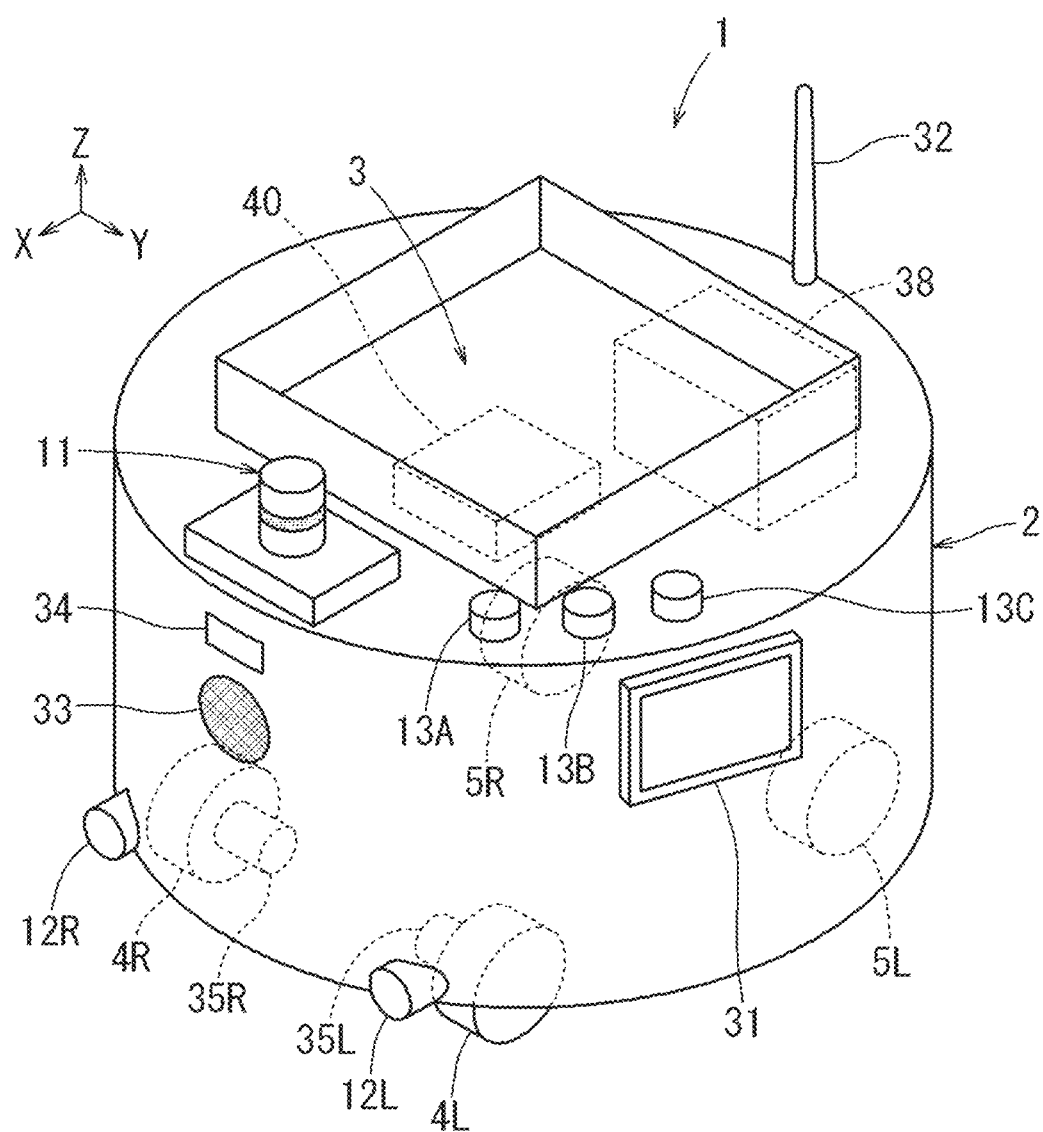
FIG. 1 is a perspective appearance view of an autonomous cart according to an embodiment of the present disclosure.

An appearance of an autonomous cart varies based on an application or a work site. In this embodiment according to the present disclosure, an autonomous cart 1 has a column-like appearance, as illustrated in FIG. 1. The autonomous cart 1 includes a body 2, a loading platform 3, a right drive wheel 4R, a left drive wheel 4L, a right caster wheel 5R, a left caster wheel 5L, an obstacle detecting member 11, a right-floor detecting section 12R, a left-floor detecting section 12L, a main switch 13A, a leaving switch 13B, a return switch 13C, a touch monitor 31, an antenna 32, a sound emitting section 33, a communication connector 34, a right motor 35R, a left motor 35L, a controller 40, and a battery 38.

The body 2 has a column-like shape, as illustrated in FIG. 1, and has the loading platform 3 disposed on a top surface of the body 2. The autonomous cart 1 autonomously travels to deliver items placed on the loading platform 3.

Figure 2:
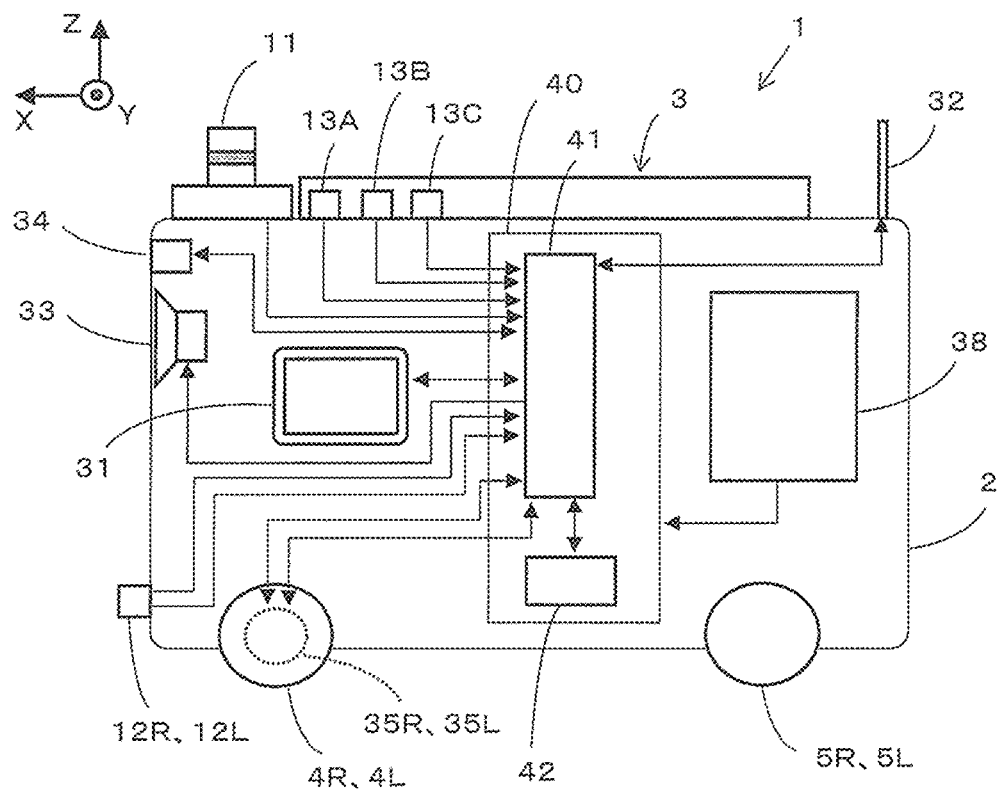
FIG. 2 is a schematic view of the autonomous cart, illustrating a whole configuration of the autonomous cart.

The right drive wheel 4R (i.e., a wheel) is disposed at a position of a front right wheel of the autonomous cart 1. A direction of the right drive wheel 4R is fixed to a straight-travel direction. The right motor 35R (i.e., a driving member) is configured to rotate the right drive wheel 4R in a forward-travel direction or a rearward-travel direction. The left drive wheel 4L (i.e., a wheel) is disposed at a position of a front left wheel of the autonomous cart 1. A direction of the left drive wheel 4L is fixed to a straight-travel direction. The left motor 35L (i.e., a driving member) is configured to rotate the left drive wheel 4L in a forward-travel direction or a rearward-travel direction. As illustrated in FIG. 2, the control section 41 is configured to control the right motor 35R and the left motor 35L separately. The control section 41 controls the autonomous cart 1 to move straight forward or rearward, turn right or left, or pivot right or left. Note that at least one of the wheels may be a drive wheel and may have a turning member that allows the autonomous cart 1 to turn left or right.

The right caster wheel 5R (i.e., a wheel) is disposed at a position of a rear right wheel of the autonomous cart 1. The right caster wheel 5R is a driven wheel and a direction of the right caster wheel 5R is changeable. The left caster wheel 5L (i.e., a wheel) is disposed at a position of a rear left wheel of the autonomous cart 1. The left caster wheel 5L is a driven wheel and a direction of the left caster wheel 5L is changeable. A direction of the right caster wheel 5R and a direction of the left caster wheel 5L change in response to movement of the autonomous cart 1, such a straight forward movement, straight rearward movement, right turning, left turning, right pivot, and left pivot.

The obstacle detecting member 11 is disposed at a front end of a top of the autonomous cart 1. The obstacle detecting member 11 is, for example, an obstacle sensor, and has an obstacle-detection region that has a two-dimensional planar and is scanned with laser beam. The obstacle detecting member 11 outputs detection information to the control section 41 (see FIG. 2). The detection information includes obstacle positions that are positions of obstacles within the planar obstacle-detection region, and obstacle luminance that is luminance of the obstacles. The obstacle detecting member 11 will be described in detail later.

The right-floor detecting section 12R is, for example an ultrasonic sensor. The right-floor detecting section 12R is configured to detect obstacles on a floor in front of the right drive wheel 4R and to output floor detection information to the control section 41 (see FIG. 2). Similarly, the left-floor detecting section 12L is, for example, an ultrasonic sensor. The left-floor detecting section 12L is configured to detect obstacles on a floor in front of the left drive wheel 4L and to output floor detection information to the control section 41 (see FIG. 2).

The main switch 13A is operated by an operator to activate and stop the controller 40. The leaving switch 13B is operated by an operator A at a position within the designated area (see FIG. 9). The leaving switch 13B is used to instruct the autonomous cart 1 at a certain position in the designated area to autonomously travel to a predetermined target point PT (e.g., a consolidating point, see FIG. 9) within the designated area (and within designated area map information). The return switch 13C is operated by an operator B who waits at the target point PT within the designated area (see FIG. 9). The return switch 13C is used to instruct the autonomous cart 1 at the target point PT within the designated area to autonomously travel to return to the operator A within the designated area (see FIG. 9).

The touch monitor 31 is configured to display a state of the autonomous cart 1 such as operating state and battery charge remaining, and is configured to receive inputs from operators.

The antenna 32 is configured to perform wireless transmission and reception to search for a wireless tag TG of the operator A in the designated area (see FIG. 9). The control section 41 is configured to search for the wireless tag TG by transmitting a response request signal to the wireless tag TG via the antenna 32 and by receiving a response signal from the wireless tag TG within an effective range via the antenna 32.

The sound emitting section 33 is, for example, a speaker, and is configured to emit sound or music to inform an operator that the autonomously travelling autonomous cart 1 is approaching the operator.

The communication connector 34 is connected with a device such as a personal computer that transmits and receives various data from the control section 41. For example, an operator can load designated area map information (information that indicates positions of obstacles within the designated area) from a personal computer into a storing section 42 (see FIG. 2) via the communication connector 34.

The battery 38 is a power source to supply power to sections, such as a control section and a detecting section, in the autonomous cart 1.

As illustrated in FIG. 2, the controller 40 includes the control section 41 (e.g., CPU), and the storing section 42 (e.g., hard disk drive). The control section 41 receives the detection information from the obstacle detecting member 11, the floor detection information from the right-floor detecting section 12R and the left-floor detecting section 12L, and operation signals from the main switch 13A, the leaving switch 13B, and the return switch 13C. For example, the control section 41 performs reading/writing of data from/into the storing section 42, transmission and reception via the antenna 32, output into/input from the touch monitor 31, and output of drive signals to the right motor 35R and the left motor 35L.

[Detection Region of Obstacle Detector (FIGS. 3 to 5)]

Figure 3:
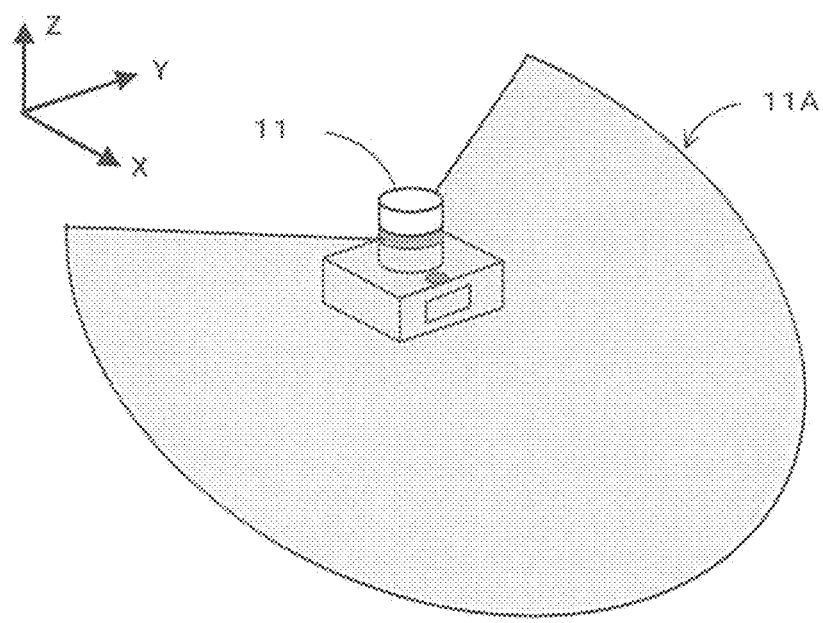
FIG. 3 is a perspective appearance view of an obstacle detector with an example of a maximal detection region.
Figure 4:
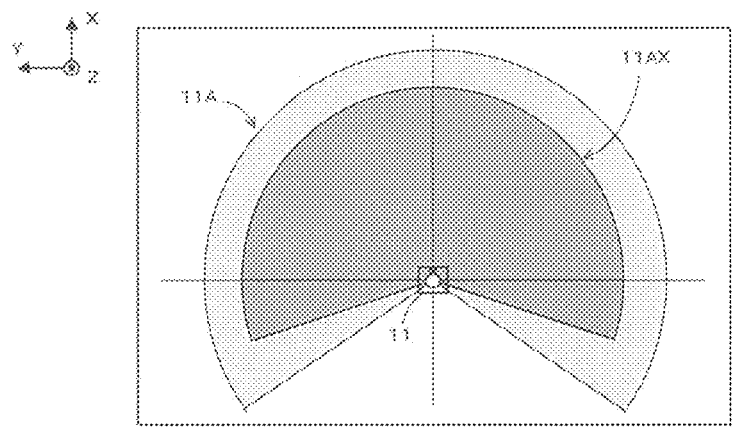
FIG. 4 is a diagram that illustrates an example of a desired detection region set within the maximal detection region of the obstacle detector.

FIG. 3 illustrates an appearance of the obstacle detecting member 11 and an example of a maximal detection region 11A. FIG. 4 illustrates a desired detection region (i.e., planar obstacle-detection region 11AX) is designated within the maximal detection region 11A of the obstacle detecting member 11 with a device such as a personal computer.

The obstacle detecting member 11 has the planar obstacle-detection region 11AX that has a two-dimensional planar shape and is scanned with laser beam (the region that is designated as illustrated in FIG. 4). The obstacle detecting member 11 is configured to output detection information to the control section 41 (see FIG. 2). The detection information includes obstacle positions, which are positions of objects (obstacles) detected within the planar obstacle-detection region, and obstacle luminance, which is luminance of the detected objects (obstacles). That is, the detection information includes position information of the objects (obstacles) such as directions and distances, and luminance of the objects (obstacles).

The maximal detection region 11A, which is a maximal range of the planar obstacle-detection region 11AX of the obstacle detecting member 11, has a fan-like shape that has, for example, a radius of approximately 5 m and a central angle of approximately 270°. A plurality of detection regions can be set (stored) in the obstacle detecting member 11 or the controller 40. More specifically, for example, detection regions are created and stored in the obstacle detecting member 11 or the controller 40 by an operator, so that the operator can switch between the detection regions with the controller 40. As illustrated in an example in FIG. 4, an operator designates (creates) a desired detection region within the maximal detection region 11A, for example, by a computer program for generating a detection region on a device such as a personal computer.

FIG. 4 illustrates an example of the planar obstacle-detection region 11AX designated (created) within the maximal detection region 11A of the obstacle detecting member 11. The operator stores the planar obstacle-detection region 11AX created with a personal computer in the obstacle detecting member 11 or the controller 40 via the communication connector 34.

Figure 5:
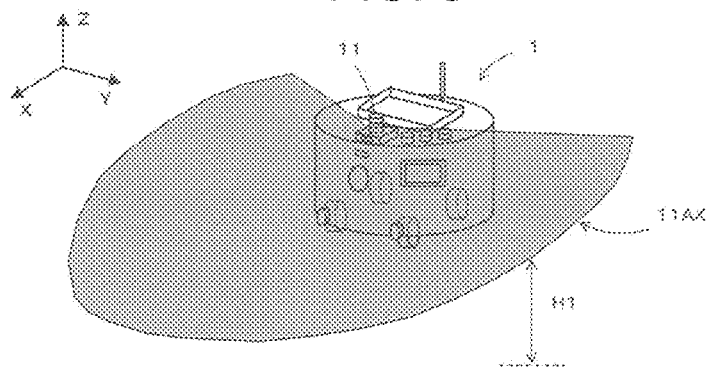
FIG. 5 is a perspective view of the autonomous cart with an example of a planar obstacle-detection region that has a two-dimensional planar shape.

As illustrated in FIG. 5, the obstacle detecting member 11 disposed at a front end of a top of the autonomous cart 1 detects distances and luminance of obstacles within the planar obstacle-detection region 11AX. The planar obstacle-detection region 11AX spreads in a horizontal direction at a height of H1 from a floor.

[Example of Designated Area Map Information (FIG. 6)]

The operator creates designated area map information with a personal computer. The designated area map information indicates positions of preliminarily known obstacles within a designated area where the autonomous cart 1 autonomously travels. The operator preliminarily stores the created designated area map information in the controller 40 (the storing section 42) via the communication connector 34.

Figure 6:
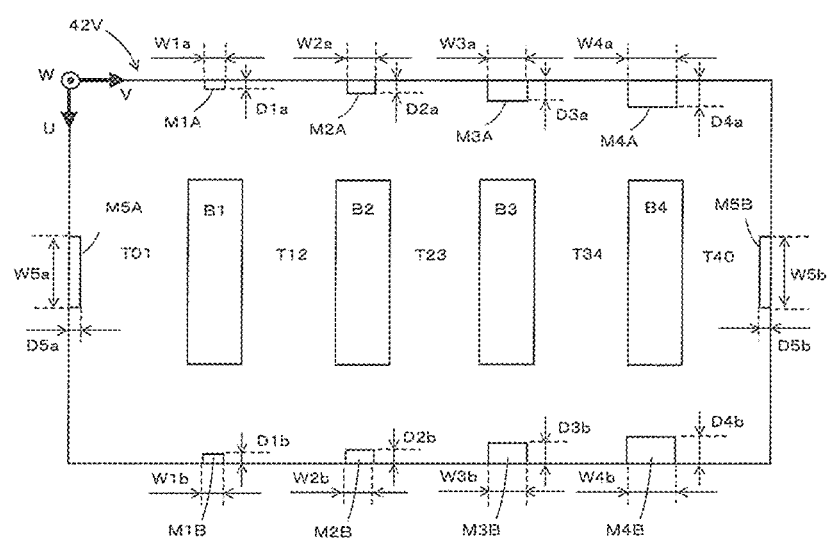
FIG. 6 is a diagram that illustrates an example of designated area map information.

FIG. 6 illustrates an example of designated area map information 42V. In this example, a designated area is a work site in a distribution center. The designated area map information 42V is a plan view of the designated area (work site), and indicates positions of preliminarily known obstacles. In the designated area map information 42V, a U-axis, a V-axis, and a W-axis are perpendicular to each other. The W-axis represents a vertically upward direction, the U-axis represents a direction toward an entrance of the designated area in a depth direction of the designated area, and the V-axis represents a rightward direction in a width direction of the designated area.

The preliminarily known obstacles in the designated area map information 42V illustrated in FIG. 6 are four wall surfaces, shelves B1 to B4 on which various items are placed, and obstacles M1A to M5A and obstacles M1B to M5B disposed on wall surfaces. The obstacles M1A to M5A and obstacles M1B to M5B each serve as a mark and have different sizes. The shelves B1 to B4 are disposed away from the wall surfaces and also disposed appropriately away from each other for allowing operators and the autonomous cart 1 to enter spaces between the wall surfaces and the shelves B1 to B4 and spaces between the shelves B1 to B4. The spaces between the wall surfaces and the shelves B1 to B4 and the spaces between the shelves B1 to B4 serve as passages through which the autonomous cart 1 travels. The obstacles M1A to M5A, M1B to M5B each serve as a mark that is used by the autonomous cart 1 to identify a current position of the autonomous cart 1. The obstacles M1A to M5A, M1B to M5B have different widths (Wxx) and different depths (Dxx). For example, if the autonomous cart 1 is at a position adjacent to two of the shelves B1 to B4, it may be difficult for the autonomous cart 1 to dearly identify a current position of the autonomous cart 1 from positions such as a position adjacent to the shelves B1, B2, a position adjacent to the shelves B2, B3, and a position adjacent to the shelves B3, B4 unless the autonomous cart 1 detects the obstacles M1A to M5A, M1B to M5B. However, if the autonomous cart 1 detects even one of the obstacles M1A to M5A, M1B to M5B, the autonomous cart 1 easily identifies a correct current position of the autonomous cart 1.

[Examples of Command Members (FIG. 7) and Command Information (FIG. 8)]

FIG. 7 illustrates appearance examples of command members to which commands for the control section of the autonomous cart 1 are assigned. The command member is, for example, a laser reflecting member that reflects laser beam used by the obstacle detecting member 11 for scanning. Laser reflectance of the command members is higher than laser reflectance of the obstacles other than the command members within the designated area. Therefore, when the control section 41 of the autonomous cart 1 detects obstacle that has luminance higher than specified luminance in the obstacle luminance contained in the detection information provided from the obstacle detecting member 11, the control section 41 identifies the detected obstacle having higher luminance as a command member.

The control section detects direction, distance, luminance, and length of an obstacle (length in a scan direction [=scan direction length]), based on a position and luminance of the obstacle contained in the detection information provided from the obstacle detecting member 11. Therefore, using command members that have various lengths in a scan direction allows respective commands to be assigned to the command members according to lengths the command members.

In FIG. 7, the scan direction corresponds to the V-axis direction. FIG. 7 illustrates appearance examples of a command member K1, a command member K2, a command member K3, and a command member K4. The command member K1 has a rectangular shape and has a length WK1 in the scan direction. The command member K2 has a circular shape and a length WK2 in the scan direction. The command member K3 has a triangular shape (that faces right) and a length WK3 in the scan direction. The command member K4 has a triangular shape (that faces left) and a length WK4 in the scan direction.

FIG. 8 depicts an example of command information 42Y in which commands are assigned according to lengths of command members in a scan direction. In the command information 42Y in FIG. 8, a "no-entry" command is assigned to a scan direction length $A1 \pm \Delta A2$. An "entry-allowed" command is assigned to a scan direction length $Bw \pm \Delta Bu$. A "stop" command is assigned to a scan direction length $C1 \pm \Delta C2$. The command information 42Y (i.e., commands) is stored in the storing section 42.

Commands are not limited to the above-described "no-entry" command, the "entry-allowed" command, and the "stop" command, and various commands are allowed to be assigned according to lengths of command members in a scan direction. In the description below, the scan direction length WK1 of the command member K1, which is illustrated in FIG. 7, corresponds to A1 in FIG. 8, and the "no-entry" command is assigned to the command member K1. The scan direction length WK2 of the command member K2 in FIG. 7 corresponds to Bw in FIG. 8, and the "entry-allowed" command is assigned to the command member K2.

[Example of Using Autonomous Cart 1 (FIG. 9)]

An example of using the autonomous cart 1 will be described with reference to FIG. 9 that illustrates a work site of a distribution center as a designated area. In a designated area 42R, processes (1) to (7) described below are performed repeatedly, and the autonomous cart 1 autonomously travels between a certain point at which the operator A works and the target point PT at which the operator B works.

(1) The operator A has a wireless tag TG. The autonomous cart 1 detects the wireless tag TG of the operator A, and follows the operator A with the wireless tag TG within a predefined range from the detected wireless tag TG.

(2) The operator A moves between the shelves B1 to B4 to pick up delivery items from a number of items placed on the shelves B1 to B4. The operator A places the picked items on the loading platform 3 of the autonomous cart 1.

(3) When the items placed on the loading platform 3 of the autonomous cart 1 reach an appropriate quantity, the operator A instructs the autonomous cart 1 to autonomously travel to the target point PT (load consolidating point) (in this case, the operator A turns on the leaving switch 13B [see FIGS. 1 and 2]).

(4) The autonomous cart 1 on which the items are placed autonomously travels within the designated area 42R while avoiding obstacles, for example, along the travel route R1 toward the target point PT, and the autonomous cart 1 stops at the target point PT. The target point PT is a predetermined position within the designated area 42R, and the operator B waits at the target point PT.

(5) The operator B receives the items from the autonomous cart 1 that has stopped at the target point PT, and instructs the autonomous cart 1 to autonomously travel to return to the operator A (in this case, the operator B releases the leaving switch 13B, and turns on the return switch 13C [see FIGS. 1 and 2]).

(6) After unloading of the items, the autonomous cart 1 autonomously travels, for example, along a travel route R2, to the operator A while avoiding obstacles within the designated area 42R for the next delivery, and stops within the predefined range from the operator A (from the wireless tag TG).

(7) The operator A releases the instruction of autonomous travel (in this case, the operator A releases the return switch 13C). Then, the process (1) is performed again.

Hereinafter, the proceeding performed by the control section 41 of the autonomous cart 1 for above-described use of the autonomous cart 1 will be described. The proceeding is performed under the condition that a command member to which the "no-entry" command is assigned and a command member to which the "entry-allowed" command is assigned are disposed within a designated area.

[Proceeding Performed by Control Section 41 (FIG. 10)]

Figure 10:
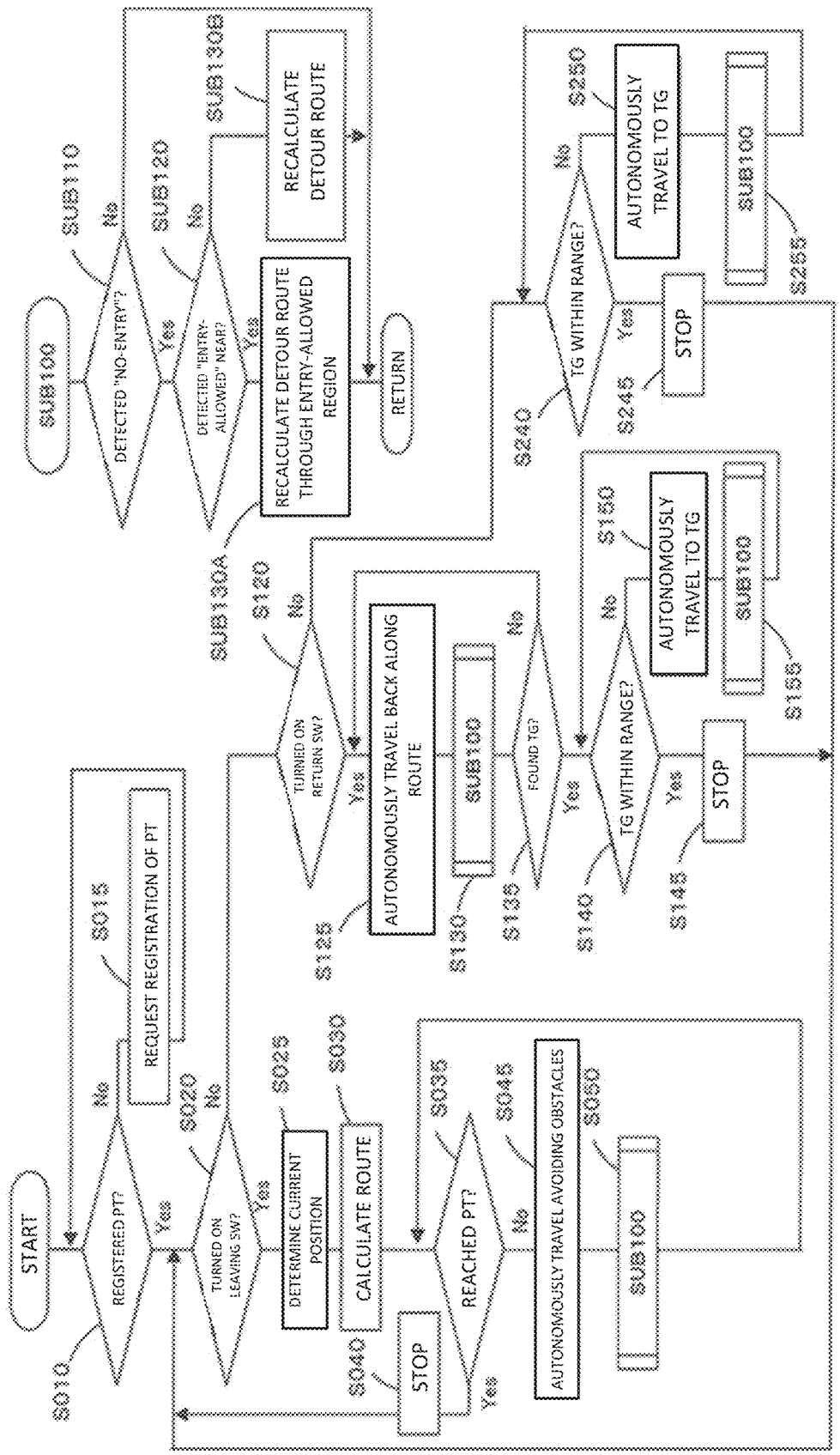
FIG. 10 is a flowchart of the proceeding performed by a control section of the autonomous cart.

A proceeding performed by the control section 41 of the controller 40 (see FIG. 2) will be described with reference to FIG. 10. For example, the control section 41 performs the proceeding illustrated in FIG. 10 in response to the operation of the main switch 13A (see FIGS. 1 and 2), beginning with step S010.

In step S010, the control section 41 reads designated area map information stored in the storing section 42, and determines whether a target point PT (see FIG. 9) is registered within the designated area map information that has been read. When the target point PT is registered (Yes is selected), the control section 41 executes step S020. When the target point PT is not registered (No is selected), the control section 41 executes step S015.

In step S015, the control section 41 requests a registration of a target point, and returns to step S010. For example, the control section 41 displays the designated area map information on the touch monitor 31 (see FIGS. 1 and 2), and displays a message "Touch a desired target point." on the touch monitor 31. The control section 41 reads the touched position, and registers the touched position as a target point.

In S020, the control section 41 determines whether the operator A (see FIG. 9) has turned on the leaving switch 13B (see FIGS. 1 and 2). When the leaving switch 13B has been turned on (Yes is selected), the control section 41 executes step S025. When the leaving switch 13B has not been turned on (No is selected), the control section 41 executes step S120. For example, both the leaving switch 13B and the return switch 13C are not allowed to be turned on simultaneously. When the leaving switch 13B or the return switch 13C is turned on by an operator, the switch 13B or 13C remains turned on until the switch is released by the operator.

Figure 11:
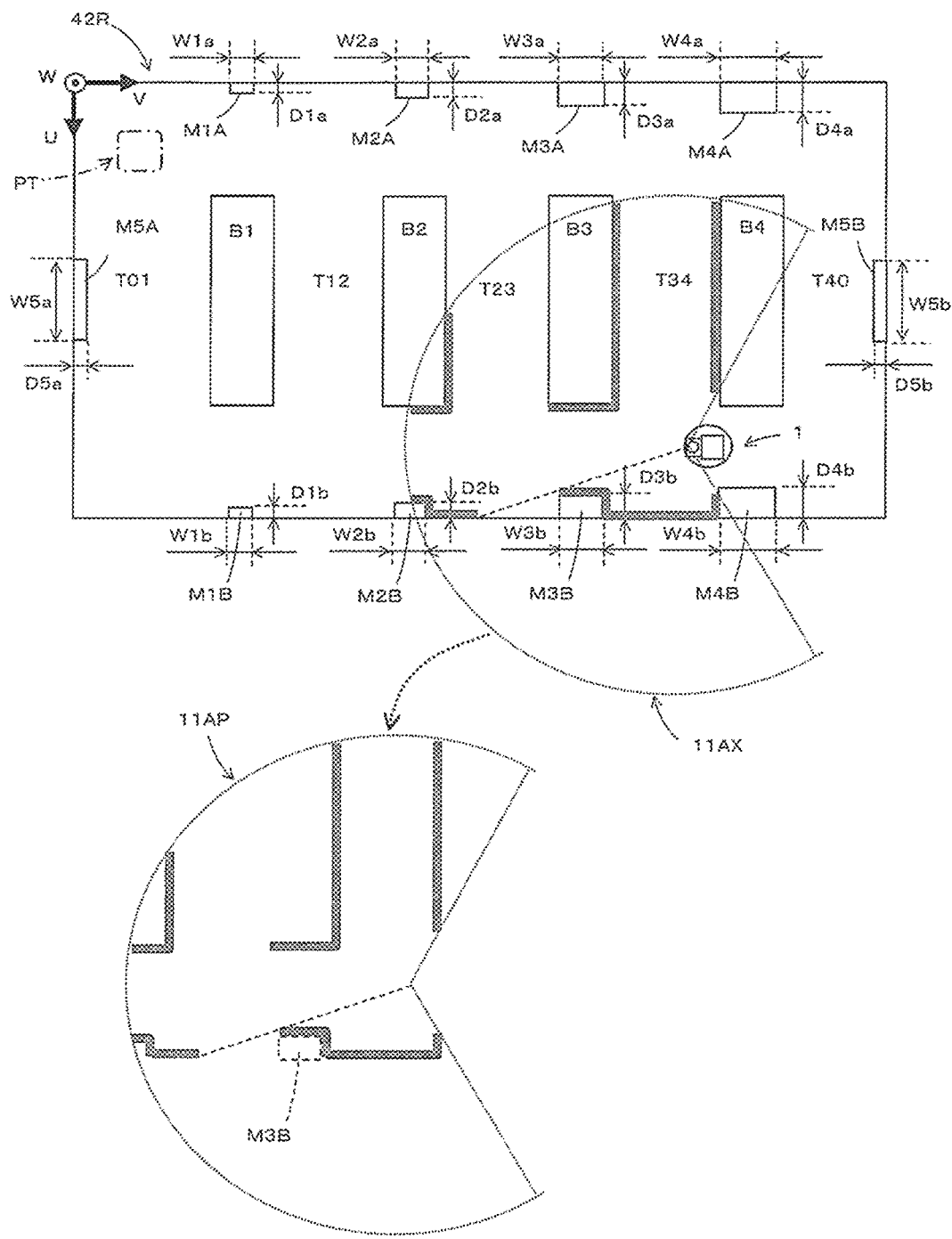
FIG. 11 is a diagram of a designated area, depicting an example of obstacle positions.

The control section 41 is configured to receive the detection information from the obstacle detecting member 11. In step S025, the control section 41 determines a current position of the autonomous cart 1 within the designated area (and within the designated area map information) based on obstacle positions contained in the detection information provided from the obstacle detecting member 11 and the designated area map information stored in the storing section 42. Then the control section 41 executes step S030. As illustrated in FIG. 11, for example, the autonomous cart 1 within the designated area 42R scans obstacles within the planar obstacle-detection region 11AX, and determines obstacle positions 11AP. The control section 41 checks the obstacle positions 11AP (see FIG. 11) in the detection information against the designated area map information (see FIG. 6) read from the storing section 42, with a checking method such as pattern matching, to determine a current position of the autonomous cart 1 within the designated area map information. In FIG. 11, the control section 41 detects the obstacle M3B serving as a mark to determine a current position P01 of the autonomous cart 1 within the designated area map information 42V illustrated in FIG. 12.

Figure 12:
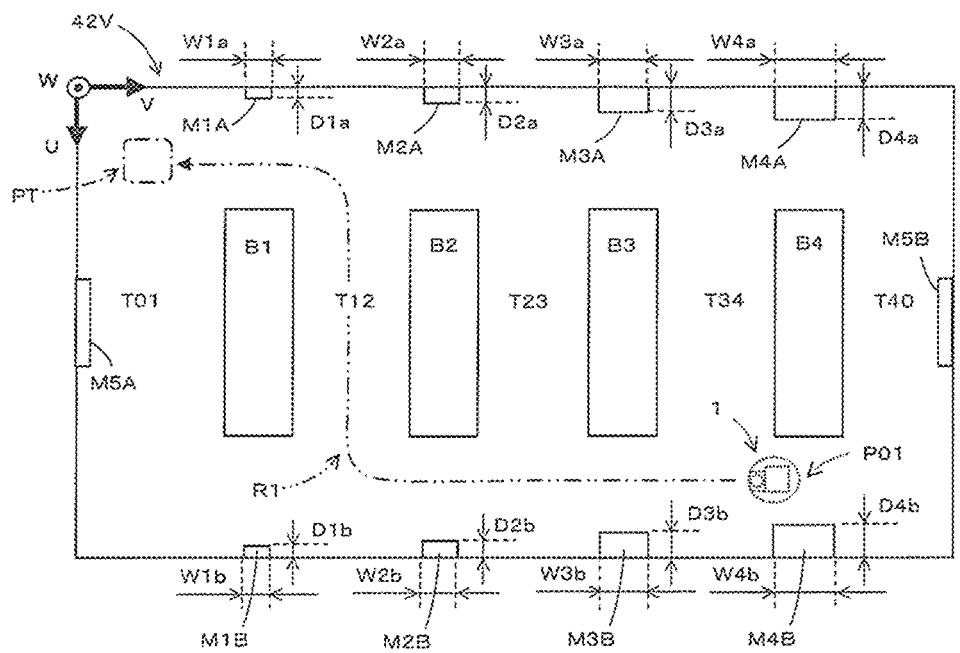
FIG. 12 is a diagram of a designated area, depicting a travel route R1 of the autonomous cart determined based on a designated area map information, a target point, and a current point of the autonomous cart.

In step S030, as illustrated in FIG. 12, the control section 41 determines, based on the designated area map information 42V, the current position P01 determined in step S025, and the target point PT registered in the designated area map information 42V, the travel route R1 on which the autonomous cart 1 travels from the current position P01 to the target point PT while avoiding obstacles. Then, the control section 41 executes step S035.

In step S035, the control section 41 determines whether the current position P01 reaches the target point PT within the designated area map information 42V (whether the current position P01 is within a predefined range from the target point PT). When the current position P01 has reached the target point PT (Yes is selected), the control section 41 executes step S040. When the current position P01 had not reached the target point PT (No is selected), the control section 41 executes step S045.

In step S040, the control section 41 stops drive of the right motor 35R and the left motor 35L, and thus stops travel of the autonomous cart 1. Then the control section 41 returns to step S020. The operator B in FIG. 9 receives items from the autonomous cart 1 that has reached and stopped at the target point PT (in step S040). The operator B releases the leaving switch 13B and turn on the return switch 13C.

In step S045, the control section 41 controls the right motor 35R and the left motor 35L to cause the autonomous cart 1 to autonomously travel along the travel route R1 (see FIG. 12) while avoiding obstacles within the designated area 42R, and updates the current position P01 within the designated area map information 42V. Then, the control section 41 executes step S050.

In step S050, the control section 41 executes subroutine SUB100. Then, the control section 41 returns to step S035 after executing subroutine SUB100.

[Detailed Proceeding in Subroutine SUB100 (FIG. 10)]

In subroutine SUB100, the control section 41 executes step SUB110.

In step SUB110, the control section 41 detects obstacles that have luminance higher than a specified luminance, in obstacle luminance contained in the detection information, while the control section 41 causes the autonomous cart 1 to autonomously travel along the travel route R1 and updates the current position P01. The autonomous cart 1 recognizes obstacles that are not stored in the designated area map information when the autonomous cart 1 obtains the detection information (command members do not need to be preliminarily stored in the designated area map information). If the control section 41 detects a command member based on the obstacle luminance in the detection information, the control section 41 detects a length of the detected command member in a scan direction, based on the obstacle position and the obstacle luminance contained in the detection information. Then the control section 41 reads a command assigned to the detected command member according to the detected length from the storing section 42, based on the length of the detected command member in the scan direction and the command information 42Y (see FIG. 8) stored in the storing section 42, to follow the command. That is, in SUB110, the control section 41 determines whether a command member is detected and whether a "no-entry" command is assigned to the detected command member. When a command member is detected and the "no-entry" command is assigned to the detected command member (Yes is selected), the control section 41 executes step SUB120. When a command member is not detected or the "no-entry" command is not assigned to the detected command member or (No is selected), the control section 41 ends subroutine SUB100 and returns to step S035.

In step SUB120, the control section 41 determines whether another command member is detected and an "entry-allowed" command is assigned to the detected command member. When another command member is detected and the "entry-allowed" command is assigned to the detected command member (Yes is selected), the control section 41 executes step SUB130A. When another command member is not detected or the "entry-allowed" command is not assigned to the detected command member (No is selected), the control section 41 executes step SUB130B.

In step SUB130A, the control section 41 recalculates a new travel route that avoids a no-entry region and passes through an entry-allowed region (changes a travel route). That is, the control section 41 is configured to control the driving member to cause the autonomous cart 1 to pass through the entry-allowed region, which is detected by the control section 41, during the autonomous travel of the autonomous cart 1. Then, the control section 41 returns to step S035.

In step SUB130B, the control section 41 recalculates a new travel route that avoids a no-entry region (changes a travel route). That is, the control section 41 is configured to control the driving member to cause the autonomous cart 1 to avoid the no-entry region detected by the control section 41 during the autonomous travel of the autonomous cart 1. Then, the control section 41 returns to step S035.

[Arrangement Example of "No-Entry" Command Members and "Entry-Allowed" Command Members (FIGS. 13 and 14)]

If the autonomous cart 1 cannot travel through a passage T12 between the shelves B1 and B2, for example, due to an unexpected drop of an item, as illustrated in FIG. 13, an operator disposes (attaches) the command member K1 to which the "no-entry" command is assigned at a height of H1 on a surface of each of the shelves B1, B2 that forms an entrance of the passage T12 (see FIG. 5).

For example, the "no-entry" commands are assigned to the two "no-entry" command members K1 to specify a no-entry region between the "no-entry" command members K1 or to specify a predefined range from each of the "no-entry" command members K1 (within a region AA in FIG. 13) to a no-entry region. Consequently, the control section 41 detects the "no-entry" commands assigned to the command members K1, and recognizes the passage T12 as "no-entry". If an unexpected limitation on the autonomous cart 1 (in this case, "no-entry") is found in a particular place (in this case, the passage T12), an operator just needs to dispose (or attach) at the particular place a command member to which a desired command is assigned. Therefore, the operator easily and quickly deals with the unexpected limitation on the autonomous cart 1 without performing troublesome work.

As illustrated in FIG. 13, if the passage T12 is specified as "no-entry" and a passage T23 next to the passage T12 and a passage T34 next to the passage T23 are specified as "entry-allowed", the control section 41 first recalculates a travel route that passes through the passage T23 or the passage T34. This reduces the amount of time for recalculation of a new travel route by the control section 41. In the example in FIG. 13, an operator disposes (attaches) the command member K2 to which the "entry-allowed" command is assigned at height of H1 on a surface of each of the shelves B3, B4 that forms an entrance of the passage T23 (see FIG. 5). The "entry-allowed region" in this case means a "priority detour route (region)".

For example, the "entry-allowed" commands are assigned to the two "entry-allowed" command members K2 to specify an entry-allowed region between the "entry-allowed" command members K2 or to specify a predefined range from each of the "entry-allowed" command members K2 (within a region BB in FIG. 13) to an entry-allowed region. Consequently, the control section 41 detects the "entry-allowed" commands assigned to the command members K2, and recognizes the passages T23, T34 as "entry-allowed". If an unexpected limitation on the autonomous cart 1 (in this case, "entry-allowed") is found in a particular place (in this case, the passages T23, T34), an operator just needs to dispose (or attach) at the particular place a command member to which a desired command is assigned. Therefore, the operator easily and quickly deals with the unexpected limitation on the autonomous cart 1 without performing troublesome work.

Figure 14:
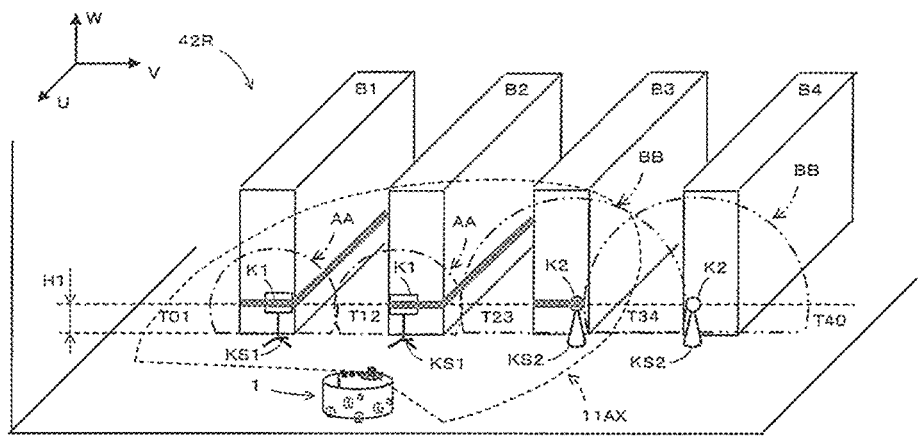
FIG. 14 is a diagram that illustrates another example of arrangement where a no-entry region and an entry-allowed region are formed with command members.

In FIG. 3, the command members K1, K2 are disposed (attached) on side surfaces of the shelves B1 to B4 in FIG. 13. However, command members may be attached to tripods or cones (command-member holders) at a height of H1, and the tripods or the cones may be disposed (placed) at entrance portions of target passages, as illustrated in FIG. 14. In an example in FIG. 14, command-member holders KS1 with the command members K1 are placed at an entrance portion of the passage T12 near the side surfaces of the shelves B1, B2. Further, command-member holders KS2 with the command members K2 are placed at entrance portions of the passages T23, T34 near the side surfaces of the shelves B3, B4. In this case, the operator just needs to place command-member holders such as tripods or cones at target particular places as necessary. Therefore, an operator more easily and quickly deals with such a limitation comparing with the case illustrated in FIG. 13.

The flowchart illustrated in FIG. 10 will be described again. In step S120 illustrated in FIG. 10, the control section 41 determines whether the operator B (see FIG. 9) has turned on the return switch 13C (see FIGS. 1 and 2). When the return switch 13C has been turned on (Yes is selected), the control section 41 executes step S125. When the return switch 13C has not been turned on (No is selected), the control section 41 executes step S240.

In step S125, the control section 41 causes the autonomous cart 1 to autonomously travel back the travel route R1 stored in the storing section 42 while avoiding obstacles and updates the current position P01 within the designated area map information 42V. Then, the control section 41 executes step S130.

In step S130, the control section 41 executes subroutine SUB100. Then the control section 41 returns to and executes step S135 after executing subroutine SUB100. The detailed proceeding performed in subroutine SUB100 has been described above, and thus will not be described again.

In step S135, the control section 41 determines whether the wireless tag TG (see FIG. 9) has been found (detected). When the wireless tag TG has been found (Yes is selected), the control section 41 executes step S140. When the wireless tag TG has not been found (No is selected), the control section 41 returns to step S125. The control section 41 finds the wireless tag TG by wirelessly transmitting and receiving a response request signal from the wireless tag TG via the antenna 32 (see FIGS. 1 and 2) during autonomous travel of the autonomous cart 1.

In step S140, the control section 41 determines based on radio field intensity and the like from the wireless tag TG whether a current position of the autonomous cart 1 is within the predefined range (e.g., within a radius of 1 m) from the wireless tag TG. When the autonomous cart 1 is within the predefined range from the wireless tag TG (Yes is selected), the control section 41 executes step S145. When the autonomous cart 1 is not within the predefined range from the wireless tag TG (No is selected), the control section 41 executes step S150.

In step S145, the control section 41 stops drive of the right motor 35R and the left motor 35L to stop travel of the autonomous cart 1. Then the control section 41 returns to step S020. The operator A in FIG. 9 releases the return switch 13C when the autonomous cart 1 returns to the operator A and stops (in step S145).

In step S150, the control section 41 causes the autonomous cart 1 to autonomously travel toward the found wireless tag TG while avoiding obstacles and updates the current position P01 within the designated area map information 42V. Then, the control section 41 executes step S155.

In step S155, the control section 41 executes subroutine SUB100. The control section 41 returns to step S140 after executing subroutine SUB100. The detailed proceeding performed in subroutine SUB100 has been described above, and thus will not be described again.

In step S240, the control section 41 determines based on radio field intensity from the wireless tag TG whether a current position of the autonomous cart 1 is within the predefined range (e.g., within a radius of 1 m) from the wireless tag TG. When the autonomous cart 1 is within the predefined range from the wireless tag TG (Yes is selected), the control section 41 executes step S245. When the autonomous cart 1 is not within the predefined range from the wireless tag TG (No is selected), the control section 41 executes step S250.

In step S245, the control section 41 stops drive of the right motor 35R and the left motor 35L to stop travel of the autonomous cart 1. Then the control section 41 returns to step S020. The operator A in FIG. 9 picks up items from the shelves to deliver the items to the target point PT. The operator A places the picked items on the loading platform 3 of the autonomous cart 1 that follows the operator A. When the items placed on the autonomous cart 1 reach an appropriate quantity, the operator A turns on the leaving switch 13B.

In step S250, the control section 41 causes the autonomous cart 1 to autonomously travel toward the wireless tag TG while avoiding obstacles and updates the current position P01 within the designated area map information 42V. Then, the control section 41 executes step S255.

In step S255, the control section 41 executes subroutine SUB100. The control section 41 returns to step S240 after executing subroutine SUB100. The detailed proceeding performed in subroutine SUB100 has been described above, and thus will not be described again.

[Cubical Obstacle Detecting Member 11BX and Examples of Detection of Shapes of Command Members (FIGS. 15 to 19)]

Figure 15:
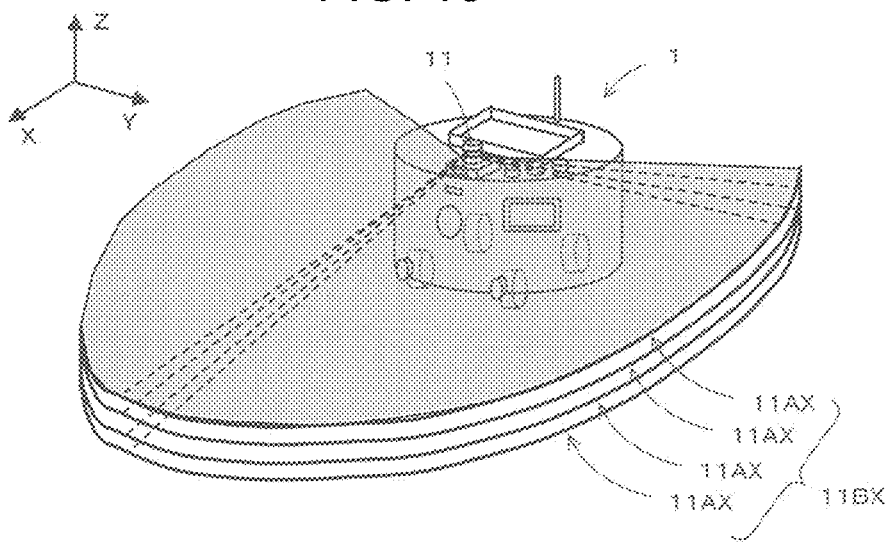
FIG. 15 is a perspective view of the autonomous cart and an example of a cubical obstacle-detection region that has a three-dimensional shape.
Figure 16:
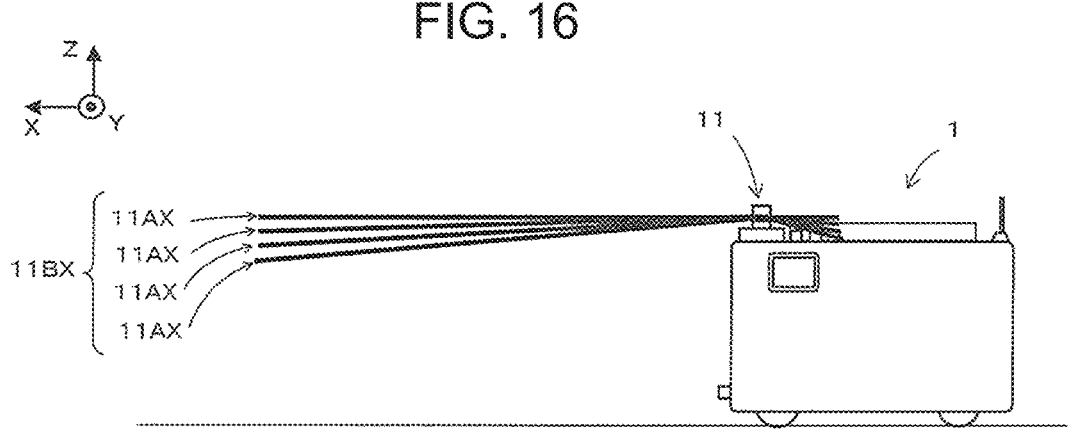
FIG. 16 is a side view of the autonomous cart and the example of the cubical obstacle detecting member.

In the above description, the planar obstacle-detection region 11AX having a two-dimensional planer shape serves as a detection region scanned by the obstacle detecting member 11 with laser beam, as illustrated in FIGS. 3 to 5. Alternatively, as illustrated in FIGS. 15 and 16, the detection region scanned by the obstacle detecting member 11 with laser beam may be a cubical obstacle detecting member 11BX that has a three-dimensional shape. The cubical obstacle detecting member 11BX includes a plurality of the planar obstacle-detection regions 11AX that are stacked on top of each other. The cubical obstacle detecting member 11BX is scanned with laser beam multiple times. For example, the cubical obstacle detecting member 11BX may include three planar obstacle-detection regions 11AX. One of three planar obstacle-detection regions 11AX has an inclination of zero relative to a horizontal direction. Another planar obstacle-detection region 11AX has a descending inclination of $\Delta\theta$ relative to the horizontal direction. Another planar obstacle-detection region 11AX has a descending inclination of $\Delta 2*\theta$. The three planar obstacle-detection regions 11AX are stacked to form the cubical obstacle detecting member 11BX, and each scanned.

Scanning the cubical obstacle detecting member 11BX enables detection of approximate height (HKx) of the command members K1 to K5 (in the W-axis direction in FIG. 17) in addition to lengths (WKx) of the command members K1 to K5 in a scan direction (in the V-axis direction in FIG. 17), as illustrated in FIG. 17. This also enables detection of approximate shapes of command members. In FIG. 17, dashed lines represent outlines of the command members K1 to K5, and thick lines represent scan trajectory made by scanning of the command members K1 to K5 (the trajectory has luminance higher than specified luminance).

The control section 41 determines the scanning trajectory based on obstacle positions and obstacle luminance contained in the detection information provided from the obstacle detecting member 11. Further, the control section 41 recognizes shapes of the command members K1 to K5 based on the determined scanning trajectory. For example in FIG. 17, the control section 41 determines that the command member K1 has a rectangular shape, based on scanning trajectory of the command member K1, and determines that the command member K2 has a circular shape, based on scanning trajectory of the command member K2. Further, the control section 41 determines that the command member K3 has a triangular shape (that faces right), based on scanning trajectory of the command member K3, and determines that the command member K4 has a triangular shape (that faces left), based on scanning trajectory of the command member K4. The control section 41 determines that the command member K5 has a triangular shape (that faces downward), based on scanning trajectory of the command member K5.

Commands may be assigned to command members according to shapes of the command members, as depicted in command information 42Z, which is stored in the storing section 42, in FIG. 18. In the command information 42Y in FIG. 8, lengths of command members in a scan direction have to be accurately managed. However, in the command information 42Z in FIG. 18, accurate management of dimensions of command members is not necessary as long as the command members have appropriate sizes, so that the command members just have to have appropriate shapes. For example, in an example in FIG. 18, a "no-entry" command is assigned to the rectangular command member K1, an "entry-allowed" command is assigned to the circular command member K2, an "entry-allowed-on-right-side" command is assigned to the right-facing triangular command member K3, an "entry-allowed-on-left-side" command is assigned to the left-facing triangular command member K4, and a "stop" command is assigned to the downward-facing triangular command member K5.

For example, command-member holders KS3 with the right-facing triangular command members K3 (entry-allowed-on-right-side) may be arranged in line, as illustrated in FIG. 19. Further, command-member holders KS4 with the left-facing triangular command members K4 (entry-allowed-on-left-side) may be arranged in line to the right of the command members K3 such that a guide path TY for guiding the autonomous cart 1 is formed between the command-member holders KS3 and the command-member holders KS4. Further, a command-member holder KS5 with the downward-facing triangular command member K5 (stop) is placed at the end of the directing passage TY in the travelling direction of the autonomous cart 1, so that the autonomous cart 1 stops before the command-member holder KS5. This helps, for example, bring the autonomous cart 1 to a desired place.

The autonomous cart 1 according to the present embodiment allows an operator to easily and quickly deal with an unexpected limitation on the autonomous cart 1 (e.g., no-entry, entry-allowed) that may be found in a particular place in the designated area 42R where the autonomous cart 1 is used, without performing troublesome work. The assignment of various commands to command members according to lengths of the command members in a scan direction or shapes of the command members is convenient to instruct the autonomous cart 1 to follow desired commands at desired places. That is, a command member to which a command for the control section 41 is assigned is disposed within a designated area at a position where execution of the command is desired.

The autonomous cart 1 according to an embodiment of the present disclosure is not limited to the configuration, structure, appearance, shape, proceeding, and the like of the present embodiment. Various modifications, additions, and omissions may be allowed without departing from the scope of the present disclosure.

In the present embodiment, the "no-entry" command, the "entry-allowed" command, the "entry-allowed-on-right-side" command, the "entry-allowed-on-left-side" command, and the "stop" command are assigned to command members. However, commands assigned to command members are not limited to the above-described commands. Various commands may be assigned to command members. Shapes, sizes, materials, and the like of command members are not limited to shapes, sizes, materials, and the like of the command members in the present embodiment. Further, numerical values used in the present embodiment are merely examples and are not limited thereto.

In addition to above-described facilities such as distribution centers, parts distribution centers, and airports, the autonomous cart 1 according to an embodiment of the present disclosure may be used at various work sites where items are collected and delivered to one place (target point) or items are delivered from one place (target point) to a certain point (a position of the operator A).

What is claimed is:

1. An autonomous cart that autonomously travels within a designated area, the autonomous cart comprising:
   an obstacle detecting member having a planar obstacle-detection region that has a two-dimensional planar shape and is scanned with a laser beam to detect an obstacle, the obstacle detecting member configured to output detection information that includes an obstacle position and obstacle luminance wherein the obstacle position is a position of the obstacle within the planar obstacle-detection region and the obstacle luminance is luminance of the obstacle;
   a plurality of wheels;
   a driving member configured to drive at least one of the wheels;
   a storing section; and
   a control section configured to control the driving member,
   wherein the storing section is configured to store designated area map information that indicates a position of a preliminarily known obstacle within the designated area,
   wherein at least one command member to which a command for the control section is assigned is included in the obstacle and is disposed within the designated area at a position where execution of the command is desired,
   wherein the control section is configured to receive the detection information from the obstacle detecting member,
   wherein the control section is configured to determine a current position of the autonomous cart within the designated area, based on the detected obstacle position and the designated area map information stored in the storing section,
   wherein the control section is configured to control the driving member based on the designated area map information and the current position of the autonomous cart to cause the autonomous cart to autonomously travel while avoiding the obstacle within the designated area,
   wherein the control section is configured to follow the command assigned to the command member that is detected by the control section based on the obstacle luminance in the detection information provided from the obstacle detecting member,
   wherein the command assigned to the command member is a no-entry command, which specifies a predefined range from the command member, or a region between the command member and another command member to which the command is assigned, as a no-entry region, and
   the control section is configured to control the driving member to cause the autonomous cart to avoid the no-entry region detected by the control section during the autonomous travel of the autonomous cart.

2. The autonomous cart according to claim 1, wherein the command member is a laser reflecting member, and laser reflectance of the command member is higher than laser reflectance of the obstacle other than the command member within the designated area, and
   the control section is configured to detect the obstacle that has a luminance higher than a specified luminance in the obstacle luminance in the detection information and to identify the detected obstacle as the command member.

3. The autonomous cart according to claim 2, wherein another command is assigned to the command member according to a scan direction length that is a length of the command member in a scan direction,
   the another command according to the scan direction length of the command member is stored in the storing section, and
   the control section is configured to detect the scan direction length of the command member based on the obstacle position and the obstacle luminance in the detection information, and the control section is configured to read the another command according to the detected scan direction length from the storing section to follow the another command.

4. The autonomous cart according to claim 2, wherein the obstacle detecting member has a cubical obstacle-detection region that has a three dimensional shape, and the cubical obstacle-detection region includes a plurality of the planar obstacle-detection regions stacked on top of each other, and is scanned with the laser beam multiple times, another command is assigned to the command member according to a shape of the command member, the another command according to the shape of the command member is stored in the storing section, and the control section is configured to detect the shape of the command member based on the obstacle position and the obstacle luminance in the detection information, and the control section is configured to read the another command according to the detected shape from the storing section to follow the another command.

5. The autonomous cart according to claim 1, wherein another command assigned to the command member is an entry-allowed command, which specifies a predefined range from the command member or specifies a region between the command member and another command member to which the command is assigned, as an entry-allowed region, and the control section is configured to control the driving member to cause the autonomous cart to pass through the entry-allowed region detected by the control section.

* * * * *